Sept. 26, 1967  A. R. CRIPE  3,343,317
WINDOW CONSTRUCTION AND MOUNTING
Filed Dec. 28, 1965

INVENTOR
ALAN R. CRIPE
BY Richard N. James.
ATTORNEY

3,343,317
WINDOW CONSTRUCTION AND MOUNTING
Alan R. Cripe, Richmond, Va., assignor to United Aircraft Corporation, East Hartford, Conn., a corporation of Delaware
Filed Dec. 28, 1965, Ser. No. 516,925
1 Claim. (Cl. 52—208)

ABSTRACT OF THE DISCLOSURE

A window assembly in which inner and outer glass panes are fixed in a resilient mounting in lateral spaced relationship, the outer pane being provided with an offset portion the outer surface of which is substantially flush with the outer edge of the sash, the resilient sash being cored internally to provide greater resilience to the sash at the inner pane than at the outer pane for maximum acoustical decoupling, the inner and outer panes being independently removable from the sash.

Summary of the invention

The present invention relates to flush-mounted windows and has as its principal object the provision of a readily-serviceable window assembly incorporating a high degree of thermal and acoustical decoupling to effectively shield the passengers internal of a vehicle from the adverse effects of the environmental conditions external of the vehicle.

This invention relates in general to flush-mounted windows and more particularly to double-glazed flush-mounted windows with inherent acoustical damping.

In the development of advanced high performance lightweight transportation equipment, including railway units, many factors must be considered in the design and construction of the windows provided in such equipment. The performance of a particular vehicle, particularly at the higher velocities, is to a large extent determined by the aerodynamic drag associated with the flow of air past the exterior surface of the vehicle. It has been standard procedure in the past to provide recessed mountings for each of the vehicle windows and one of the larger drag losses is attributable to the disruption of air flow past these recesses. These losses can be substantially reduced by providing window units wherein the outer pane is flush with the exterior skin of the equipment whereby a smooth unbroken surface is presented to the flow of air.

From the standpoint of passenger comfort and safety and product acceptance several other factors must be taken into account into window design considerations. At the higher speeds envisioned in connection with high performance equipment, higher relative impact velocities may be expected in connection with foreign object collisions against the window glass. It is advisable therefore to provide means for reducing the effect of foreign object impact against the glass, particularly as that effect is transmitted to the interior of the vehicle.

Still further, passenger comfort dictates that the vehicle interior be effectively isolated from the environment external to the vehicle, especially the transfer of heat and sound through the window unit. For this reason an effective barrier to the transmission of heat and sound must, also, be provided in any window arrangement contemplated.

It is an object of this invention to provide a window mounting of low aerodynamic drag for high speed transportation equipment.

It is an additional object of this invention to provide means for the flush mounting of double-glazed windows in a vehicle.

A further object is to provide a double-glazed flush-mounted window assembly with inherent acoustical damping.

A still further object is to provide a window assembly for a high speed vehicle which includes an effective barrier to the transmission of heat and sound through the window unit.

Another feature is the provision in a flush-mounted double-glazed window of means for isolating the inner glass pane from the forces generated at and by the outer pane.

These and other objects and advantages of this invention will be set forth in the following description or will be evident therefrom or from practice of the invention.

The window assembly of this invention may be described broadly as a flush-mounted double-glazed window which is held resiliently in an opening provided in the exterior surface of an enclosed vehicle, the individual panes of the window being laterally spaced and being held in position in grooves provided in a resilient sash. It further contemplates provision in the window assembly for supporting the inner pane of glass on a more elastic basis than the outer pane for acoustically isolating and decoupling the panes.

Figure 1:
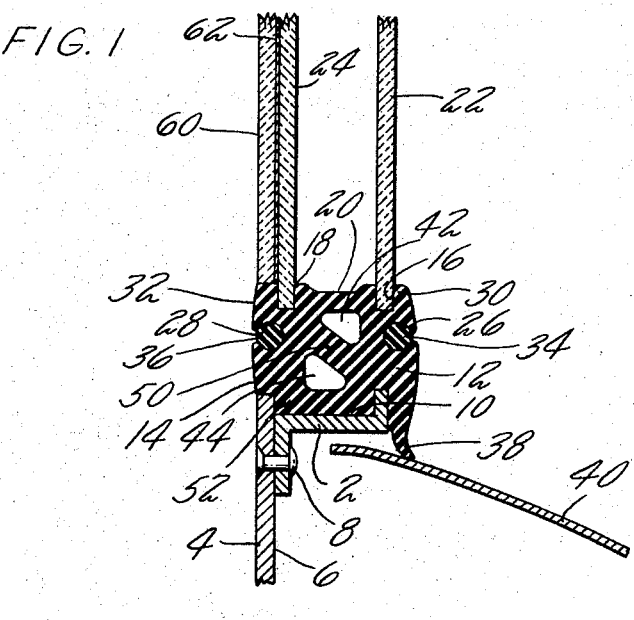
FIGURE 1 is a fragmentary cross-sectional view of the window assembly, illustrating particularly the design of the resilient sash in which the glass panes are mounted on the supporting structure.
Figure 2:
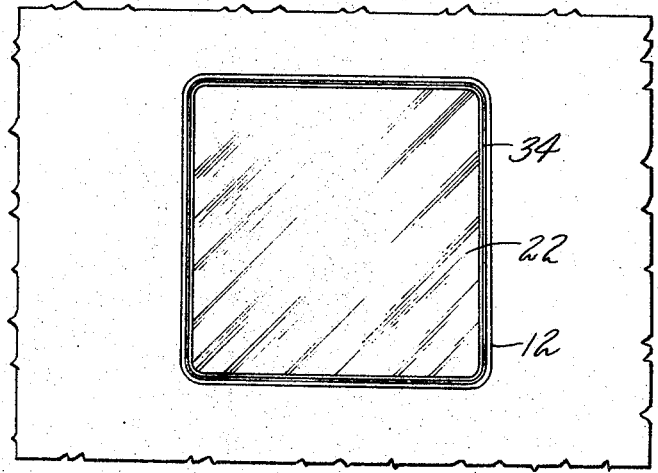
FIGURE 2 is a view of the window taken in elevation.

In its more preferred embodiment, as seen in FIGURES 1 and 2, a sash mounting support 2 comprising a Z-section is provided around a window opening in the skin 4 of a vehicle. The Z-section is fastened to the inner surface 6 of the vehicle skin by rivets 8, or other suitable fastening means, to form a trough 10 into which a resilient sash 12 is positioned. Firm support for the sash is therefore provided around the entire window opening.

The resilient sash 12 is preferably a rubber extrusion, the external periphery of which is formed to seat snugly in the trough 10 and which is cut to an appropriate length and vulcanized to make one piece which extends completely therearound. In order to minimize aerodynamic drag along the outer surface of the vehicle, the sash is shaped to bring its outer edge 14 into substantial alignment with the exterior of the vehicle. A pair of peripheral grooves 16 and 18 are formed in the internal surface 20 of the sash, the grooves each being of sufficient width and depth to closely contain and support inner and outer panes of glass, 22 and 24, respectively, in lateral spaced relationship.

Channels 26 and 28 are cut in the inner and outer edges of the sash, respectively, adjacent the bottom of the grooves 16 and 18, the channels extending around the entire periphery of the sash. The combination of channel 26 and groove 16 forms an inner deformable lip 30 in the sash over which the inner pane 22 may be passed during installation in the assembly. Similarly, the combination of channel 28 and groove 18 forms an outer deformable lip 32 to accommodate installation of the outer pane 24. It will be seen that replacement of a broken pane may be accomplished without removing the assembly from the vehicle or otherwise disturbing the unbroken pane.

To prevent loosening or disengagement of the individual panes after installation in the assembly, zipper strips 34 and 36 are forced into the channels whereby unintentional deformation of the lips is prevented. The zipper strips preferably comprise continuous rubber rings of sufficient cross-sectional diameter to completely fill the channels at installation.

In the embodiment shown, a dependent flap 38 is provided in the resilient sash to mate with the window train section 40. This flap is provided primarily for aesthetic reasons, but it may also be seen to facilitate installation of the window trim.

In the transportation of passengers at the higher speeds it becomes increasingly important to isolate the passenger from the noise and vibrations generated external to the vehicle. Since the outer pane of glass is resiliently mounted in the vehicle, it is evident that considerable flutter can be expected at the outer pane due to the changing loads against the outside of the glass, as for example, during entrance into tunnels or the close passage of other vehicles. In order to minimize the vibration and acoustical effects felt at the inner pane, means is provided for supporting the inner pane on a more elastic basis than the outer pane. For this purpose the sash 12 is cored internally, providing passages 42 and 44 between the plane of respective panes of glass. An alternative scheme would provide a channel in the surface of the resilient sash between the panes.

Passage 42 is the key element in providing acoustical isolation for the inner pane. By providing a void comprising passage 42 in the sash between the panes of glass, the transmission of vibration or acoustical forces therebetween is substantially reduced. For the maximum acoustical decoupling effect, passage 42 should be located above the cross-sectional centerline of the sash and, as hereinbefore indicated, may communicate with the surface of the sash between the panes. Passage 44 is optionally provided in the sash to provide a measure of control over the firmness of the support which is given to the outer pane. In the sash configuration shown, the bulk of the forces generated by movement of the outer pane are transmitted directly to the support member 10 along webs 50 and 52 and the inner pane is accordingly isolated from these forces.

In order to further reduce the aerodynamic drag associated with the flow of air past the exterior of the car, an offset portion 60 is provided on the external surface of the outer pane, the offset portion comprising a third pane of glass laminated to the outer pane. It is, of course, obvious that the offset portion could be formed integral with the outer pane. The most preferred construction for the outer pane, however, including the offset portion, comprises two panes of glass with a plastic 62 laminated therebetween to minimize the effects in the interior of the car from foreign object collisions with the glass. In this way a construction is provided which is similar to the "safety glass" commonly found in automotive windshields.

Because the pane is held in a resilient mounting it will have a natural tendency to give when subjected to external forces, lessening the chances of breakage due to foreign object collisions. This natural tendency may be enhanced by the use of the so-called "flexible" glasses, and such use is contemplated in the present invention.

Through the practice of this invention a window unit has been provided which exhibits minimum aerodynamic drag; provides effective thermal insulation and acoustical isolation; is simply installed and provides for simple maintenance and repair.

While this invention has been illustrated and described with reference to a particular preferred embodiment, no limitation is intended thereby. Various modifications in the window construction and mounting are contemplated within the scope of the following claim.

What is claimed is:

In a vehicle having a window opening, a window assembly comprising:
  inner and outer glass panes in lateral spaced relationship, the outer pane including an outwardly-directed offset portion comprising a third glass pane laminated thereto,
  a rubber sash encircling the panes and abutting the exposed edge of the window opening, the sash having a pair of peripheral grooves formed in its interior surface into which the inner and outer panes are closely fitted, the external surface of the third pane being substantially flush with the outer edge of the sash with its edge abutting the sash circumferentially, the inner and outer edges of the sash each having a channel formed therein adjacent the periphery of the respective panes, the respective grooves and channels forming inner and outer deformable lips in the sash over which the inner and outer panes may be passed to engage in the grooves, the sash being cored internally on an axis parallel to the cross-sectional centerline of the sash and asymmetrically thereof to provide greater resilience of the sash at the inner groove than at the outer groove,
  a zipper strip closely fitted in each channel to prevent disengagement of the inner and outer panes through unintentional deformation of the lips,
  and means for supporting the sash firmly in the window opening.

References Cited

UNITED STATES PATENTS

| | | | |
|---|---|---|---|
| 2,189,388 | 2/1940 | Zand | 52—172 X |
| 2,356,878 | 8/1944 | Painter | 52—208 |
| 2,609,071 | 9/1952 | Morgann et al. | 52—400 |

FOREIGN PATENTS

| | | |
|---|---|---|
| 554,957 | 3/1958 | Canada. |
| 148,698 | 2/1955 | Sweden. |

KENNETH DOWNEY, *Primary Examiner*